(12) United States Patent
Kimura et al.

(10) Patent No.: US 10,817,756 B2
(45) Date of Patent: Oct. 27, 2020

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Shunichi Kimura, Kanagawa (JP); Masanori Sekino, Kanagawa (JP); Ikken So, Kanagawa (JP); Satoshi Kubota, Kanagawa (JP); Takuya Sakurai, Kanagawa (JP); Kumi Fujiwara, Kanagawa (JP); Kunikazu Ueno, Kanagawa (JP); Yutaka Koshi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 127 days.

(21) Appl. No.: 16/159,259

(22) Filed: Oct. 12, 2018

(65) Prior Publication Data
US 2019/0385008 A1   Dec. 19, 2019

(30) Foreign Application Priority Data
Jun. 13, 2018 (JP) ................................. 2018-113013

(51) Int. Cl.
*G06K 9/62* (2006.01)
*G06N 7/00* (2006.01)

(52) U.S. Cl.
CPC .......... *G06K 9/627* (2013.01); *G06K 9/6201* (2013.01); *G06N 7/005* (2013.01); *G06K 2209/01* (2013.01)

(58) Field of Classification Search
CPC .. G06K 9/03; G06K 9/00449; G06K 9/00456; G06K 2209/01; G06K 9/627; G06K 9/6201; G06N 7/005
See application file for complete search history.

(56) References Cited

U.S. PATENT DOCUMENTS

| | | | | |
|---|---|---|---|---|
| 5,455,872 A | * | 10/1995 | Bradley | ............... G06K 9/6292 |
| | | | | 382/228 |
| 5,621,818 A | | 4/1997 | Tashiro | |
| 2010/0104192 A1 | * | 4/2010 | Katsuyama | ............ G06K 9/627 |
| | | | | 382/190 |

FOREIGN PATENT DOCUMENTS

| | | |
|---|---|---|
| JP | H05-020500 A | 1/1993 |
| JP | H05-040853 A | 2/1993 |
| JP | H05-290169 A | 11/1993 |

(Continued)

*Primary Examiner* — Leon Viet Q Nguyen
(74) *Attorney, Agent, or Firm* — Oliff PLC (57) ABSTRACT

An information processing apparatus includes a determination, first, second and third receiving, and first and second checking units, and a controller. When a determination result matches a first determination result, the first checking unit outputs a matching determination result as the final output. The second checking unit checks the first determination result against a second. The first and second determination results are respectively received by the first and second receiving units. When the first determination result matches the second, the second checking unit outputs the matching determination result as the final output. When the input information is received, the controller operates the determination, first receiving, and first checking units. When it is determined that the determination result does not match the first determination result, the controller operates selectively one of a unit set and the third receiving unit. The unit set is constituted by the second receiving and checking units.

8 Claims, 6 Drawing Sheets

(56) References Cited

FOREIGN PATENT DOCUMENTS

| | | |
|---|---|---|
| JP | H08-101880 A | 4/1996 |
| JP | H09-134410 A | 5/1997 |
| JP | H09-259226 A | 10/1997 |
| JP | 2008-20506 A | 1/2008 |
| JP | 2011-237905 A | 11/2011 |
| JP | 2016-212812 A | 12/2016 |

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-113013 filed Jun. 13, 2018.

BACKGROUND

(i) Technical Field

The present disclosure relates to an information processing apparatus and a non-transitory computer readable medium.

(ii) Related Art

There is a data entry system which converts a string, which is handwritten or printed on form paper, into digital data. The data entry system converts a string on form paper into digital data by using a system in which a person reads the form and inputs the read information through key input, a system in which a character recognizer using an optical character recognition (OCR) technique performs character recognition on an image on the form, or a combination of these.

Many character recognizers have a function of outputting a degree indicating how reliable the processing result of an executed recognition process is. This degree is called a recognition probability.

Other than character recognizers, units of performing some automatic determination on an input image are present. Among these automatic determination units, some units output the accuracy of an executed determination.

Japanese Unexamined Patent Application Publication No. 2016-212812 discloses a system. In the system, character recognition is performed on an image on an input form, and the degree of similarity as the character recognition result is obtained. The obtained degree of similarity is compared with a pre-registered confidence factor which the character recognition is required to have. On the basis of the comparison result, one of the following output processes is performed: an output process that does not need a manual verification process on the character recognition result; an output process of presenting character recognition candidate options for the character recognition result and prompting a person to perform a manual verification process; and an output process of requesting new manual input and determination for the character recognition result and prompting persons to perform input manually.

Japanese Unexamined Patent Application Publication No. 2011-237905 discloses a character recognition apparatus including a character recognition unit, a feature extraction unit, a reliability calculation unit, and a post-processing controller. The character recognition unit recognizes a coordinate point sequence of handwritten characters and outputs recognition candidate characters. The feature extraction unit calculates the average writing speed of the coordinate point sequence of the handwritten characters, as feature values for calculating reliability scores of the determination-target recognition candidate characters that are output from the character recognition unit. The reliability calculation unit calculates the reliability scores of the determination-target recognition candidate characters on the basis of the feature values from the feature extraction unit and the statistical trend of sample data. The post-processing controller controls post-processing on the determination-target recognition candidate characters on the basis of the reliability scores from the reliability calculation unit.

Japanese Unexamined Patent Application Publication No. 2008-20506 discloses a method. In the method, a logic component is extracted from an input document image. It is determined whether or not the extracted logic component is a string area. The discriminated string area is subjected to character recognition. If the confidence factor of the recognition result is equal to or greater than a threshold, the string area is displayed as a text. If the confidence factor is less than the threshold, the string area is displayed as a partial image.

A classification unit of the information processing apparatus disclosed in Japanese Unexamined Patent Application Publication No. 2016-212812 classifies a character recognition target into any of three types. When the classification unit classifies the character recognition target into the first type, an extraction unit extracts the character recognition result of the character recognition target. When the classification unit classifies the character recognition target into the second type, a first controller exerts control so that the character recognition result of the character recognition target is extracted and a character recognition target is input by a person. When the classification unit classifies the character recognition target into the third type, a second controller exerts control so that multiple persons manually input the character recognition target.

Japanese Unexamined Patent Application Publication No. 2011-237905 discloses the system obtained by combining a data entry system, in which data entry is performed by a person, with a character recognizer using OCR.

Japanese Unexamined Patent Application Publication No. 2008-20506 describes an example in which processing is performed in combination with an OCR recognition result and the recognition probability.

Japanese Unexamined Patent Application Publications No. 5-40853, No. 5-20500, No. 5-290169, No. 8-101880, No. 9-134410, and No. 9-259226 describe various methods of calculating the recognition probability of character recognition.

The case in which the result of automatic determination performed by a character recognizer or the like is used, as it is, as the final output from a system is temporarily not taken into account. Under this condition, a first checking process or a second checking process is used in accordance with the recognition probability of the automatic determination. The first checking process is a process of checking the result from the automatic determination against the determination result from a person. The second checking process is a process of checking the determination results from two different persons against each other. In this case, an input whose recognition probability is in a relatively high range is routed to the first checking process. An input whose recognition probability is in a relatively low range is routed to the second checking process.

Inputs routed to the second checking process due to a low recognition probability include an input whose result from the automatic determination is correct. This is due to an error occurring because the recognition probability is an estimate. When an input whose result from the automatic determination is correct is routed to the second checking process due to its low recognition probability, the result from the automatic determination is not used, and, instead, the wasteful cost of determination performed by one person is required. Thus, a method of using the first checking process or the second checking process in accordance with the recognition probability of automatic determination may cost man-hours for manual determination unnecessarily.

SUMMARY

Aspects of non-limiting embodiments of the present disclosure relate to a method achieving reduction in man-hours for manual determination compared with a method of using the first checking process or the second checking process in accordance with the recognition probability of automatic determination.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a determination unit, a first receiving unit, a second receiving unit, a third receiving unit, a first checking unit, a second checking unit, and a controller. The determination unit performs determination on input information and outputs a determination result. The first receiving unit receives a first person's input of a first determination result on the input information. The second receiving unit receives a second person's input of a second determination result on the input information. The third receiving unit receives a third person's input of a third determination result on the input information and outputs the third determination result as a final output. The first checking unit checks the determination result against the first determination result. The determination result is output by the determination unit. The first determination result is received by the first receiving unit. When the determination result matches the first determination result, the first checking unit outputs the matching determination result as the final output. The second checking unit checks the first determination result against the second determination result. The first determination result is received by the first receiving unit. The second determination result is received by the second receiving unit. When the first determination result matches the second determination result, the second checking unit outputs the matching determination result as the final output. When the input information is received, the controller operates the determination unit, the first receiving unit, and the first checking unit. When it is determined, in the checking performed by the first checking unit, that the determination result from the determination unit does not match the first determination result received by the first receiving unit, the controller further operates selectively one of a unit set and the third receiving unit. The unit set is constituted by the second receiving unit and the second checking unit.

BRIEF DESCRIPTION OF THE DRAWINGS

Exemplary embodiment of the present disclosure will be described in detail based on the following figures, wherein.

DETAILED DESCRIPTION

Before description about an exemplary embodiment, the mechanism of an existing data entry system which is to be compared with the present exemplary embodiment will be described by referring to FIG. 6.

The system receives, as an input image, an image on which a string is described. A classifier 60 performs character recognition on the input image by using a character recognizer 62 included therein. The classifier 60 classifies the input image by using the recognition probability P that is output by the character recognizer at that time. The recognition probability indicates the degree of accuracy at which the text code that is a recognition result from the character recognizer 62 correctly describes the string (which may be handwritten) included in the input image. The higher the recognition probability is, the higher the likelihood that the text code that is a recognition result is correct (that is, correctly describes the string in the input image) is. A certain threshold is set as the threshold T1. If the recognition probability P is higher than the threshold T1 (P>T1), the system outputs the recognition result from the character recognizer 62, as it is, as the final recognition result from the system. This indicates a path (processing path) indicated by using symbol X in FIG. 6. In FIG. 6, three character recognizers 62 are illustrated. These indicate the same single character recognizer. In FIG. 6, to facilitate understanding of the processes along three paths branching off in accordance with classification performed by the classifier 60, all processing components used along each of these paths are illustrated. Therefore, the same character recognizer 62 is illustrated multiple times.

In the system, a certain threshold lower than the threshold T1 is set as the threshold T2. If the recognition probability P is equal to or less than T2 (P T2), the process proceeds to path Z. For the case of path Z, two operators (Person B and Person C) perform key input of strings recognized by reading the input image. These inputs are received by key input units 72 and 74 in the system. A second checking unit 76 checks the input results (text data) from Person B and Person C against each other. If the checking result indicates that the input results matches each other, the matching input result is output as the final recognition result from the system. If the checking result indicates that the input results do not match each other, Person E who is neither Person B nor Person C is requested to input the string indicated by the input image. The input is received by a key input unit 78. The input from Person E is output as the final recognition result from the system.

If the recognition probability P is neither high nor low, that is, T2<P≤T1, the process proceeds to path Y, and a key input unit 64 receives key input of the recognition result of the input image from Person A. A first checking unit 66 checks the recognition result from the character recognizer 62 against the key input result from Person A. If the checking result indicates that the recognition result matches the key input result, the matching recognition result is output as the final recognition result from the system. If the recognition result does not match the key input result, Person D who is not Person A is requested to input the string indicated by the input image. The input is received by a key input unit 68. The input from Person D is output as the final recognition result from the system.

Thus, the input image is recognized along one of three paths X, Y, and Z, and the string code "ABC" included in the input image is obtained.

In this mechanism, persons who perform the input are five persons, Person A to Person E. However, five different persons are not necessarily required. If the condition that Person A and Person D are different from each other and that Person B, Person C, and Person E are different from each other is satisfied, fewer than five persons may be used.

Thus, in the existing system, the lower the recognition probability from the character recognizer 62 is, the lower the reliability of the recognition result from the character recognizer 62 is. Therefore, the existing system employs a system in which more persons are involved.

The recognition probability is merely an estimate of reliability of the character recognition performed by the character recognizer 62. Therefore, the recognition probability includes an error. For example, if the recognition probability P is equal to or less than the threshold T2 that is the lower threshold, the process proceeds to path Z in the system, and data entry is performed only using manual input without using the recognition result from the character recognizer 62. However, the recognition probability P is merely an estimate. Therefore, even if the recognition probability P is equal to or less than the threshold T2, the recognition result from the character recognizer 62 may be sometimes correct. In this case, the method indicated by path Z along which, without using the recognition result from the character recognizer 62, an input from one person is instead used produces wasteful manual input cost.

Accordingly, in the exemplary embodiment, the following mechanism is proposed. The mechanism reduces wasteful cost, as much as possible, produced by the state in which, although a recognition result from the character recognizer is correct, the recognition result is not used as data entry.

Figure 1:
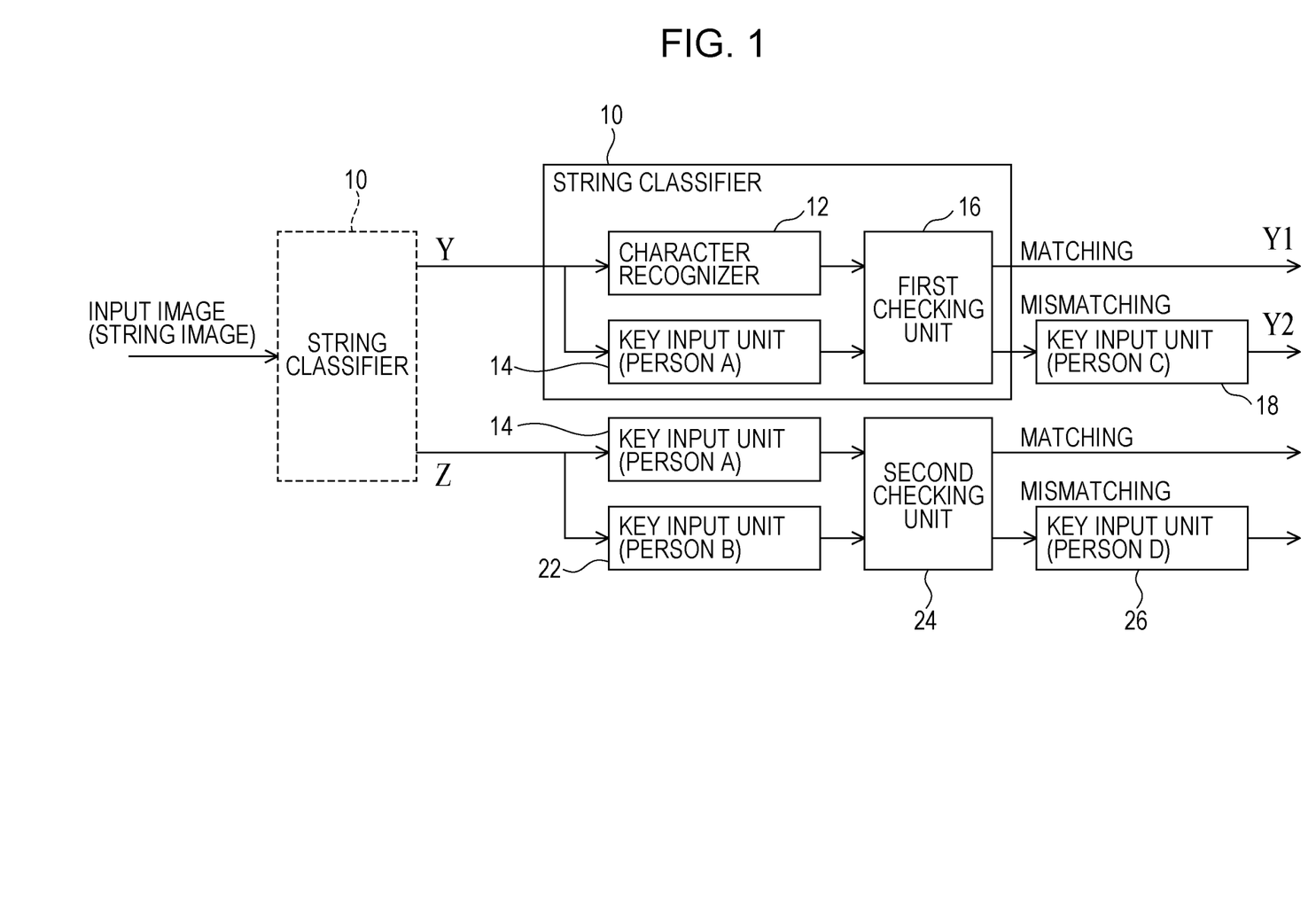
FIG. 1 is a diagram for describing the processing mechanism of a data entry system according to an exemplary embodiment.

FIG. 1 illustrates the processing mechanism of a data entry system according to the exemplary embodiment. FIG. 1 is used to describe the characteristics of the exemplary embodiment compared with the existing system (FIG. 6) described above. The mechanism in FIG. 1 indicates improvements in the portion including paths Y and Z (a portion 600 surrounded by using a dashed line in FIG. 6) in the existing example in FIG. 6, and path X is not taken into account. Therefore, a mechanism obtained by adding path X to the mechanism in FIG. 1 may be used (This mechanism will be described below). In addition, the mechanism in FIG. 1 may be regarded as a system in which the recognition result from the character recognizer, which is not used alone as the final output from the system, is necessarily checked against the recognition result from a person.

In this system, a set of a character recognizer 12, a key input unit 14, and a first checking unit 16 is used as a string classifier 10. That is, routing between path Y (especially, path Y1) and path Z is performed on the basis of the checking result between the recognition result from the character recognizer 12 and the recognition result from a person. Typically, character recognition performed by a person has recognition accuracy much higher than that of character recognition performed by character recognizer using an optical character recognition (OCR) technique. Therefore, if the recognition result from a person matches the recognition result from the character recognizer, the probability that the recognition results are correct is very high. In contrast, if the recognition result from a person does not match the recognition result from the character recognizer, the probability that the recognition result from the character recognizer is wrong is high. In FIG. 1, a block using a dashed line and a block using a solid line are illustrated. These blocks indicate the same.

That is, in this system, an input image is always presented to the character recognizer 12 and a single person (for example, Person A). The character recognition result of the input image from the character recognizer 12 is obtained, and the recognition result of the input image from Person A is obtained by using the key input unit 14. Then, the first checking unit 16 checks both of the recognition results against each other. If the checking result indicates that both of the recognition results match each other, the matching recognition result is output as the final recognition result from the system (path Y1 in FIG. 1).

In contrast, if the checking result from the first checking unit 16 indicates that the recognition result from the character recognizer 12 does not match Person A's recognition result that is received by the key input unit 14, the subsequent process is made to proceed along path Y2 or path Z in FIG. 1 in accordance with a given criterion.

The point of the mechanism in FIG. 1 is that, as the criterion for routing (classification) between path Y (especially, Y1) and path Z, the recognition probability P from the character recognizer 12 is not used, and, instead, the checking result from the first checking unit 16 is used. That is, in the mechanism in FIG. 1, even when the recognition probability P is very low (P T2), if the checking result from the first checking unit 16 indicates that the recognition result from the character recognizer 12 matches Person A's recognition result, the matching recognition result is finally output. That is, even in the case where the recognition probability P is low, when the recognition result from the character recognizer 12 is correct, only one person is required for manual input. In contrast, in the existing system in FIG. 6, when the recognition probability P is very low, the recognition result from the character recognizer is not used, and two persons' recognition results are always checked against each other. Therefore, man-hours more than those in the mechanism in FIG. 1 are required. Thus, in the mechanism in FIG. 1, man-hours are reduced by routing, to path Y (only one person is required), some input images that are routed, in the existing system in FIG. 6, to path Z (two persons are required) in accordance with the recognition probability.

In the mechanism in FIG. 1, for the role of the string classifier 10, at least one person's (Person A's) input of the recognition result is always received. Therefore, this input from one person is also used as one of two persons' recognition results which are checked against each other along path Z. That is, a second checking unit 24 checks Person A's recognition result, which is received by the key input unit 14, against the recognition result, which is received by a key input unit 22, from Person B who is not Person A. If the checking result indicates that Person A's recognition result matches Person B's recognition result, the second checking unit 24 outputs the recognition result as the final processing result from the system. If the second checking unit 24 finds that Person A's recognition result does not match Person B's recognition result, the recognition result of the input image from Person D who is neither Person A nor Person B is received by a key input unit 26. Person D's recognition result is output as the final recognition result from the system.

In the description above, routing (classification) of the recognition process between path Y2 and path Z performed when the first checking unit 16 finds that both the recognition results do not match each other is not described. There are several systems for this case. One example is a system of performing routing by using the recognition probability P of the input image from the character recognizer 12. This is similar to the idea of the existing system in FIG. 6. That is, in this system, if the recognition probability P is greater than the threshold T2 which is a certain threshold, the string classifier 10 causes the recognition process to proceed along path Y2. If the recognition probability P is equal to or less than the threshold T2, the string classifier 10 causes the recognition process to proceed along path Z. For the case of path Y2, the recognition result of the input image from Person C who is not Person A is received by a key input unit 18. This recognition result is output as the final recognition result from the system.

A reason why routing between paths based on the recognition probability P from the character recognizer 12 is effective is as follows.

Figure 6:
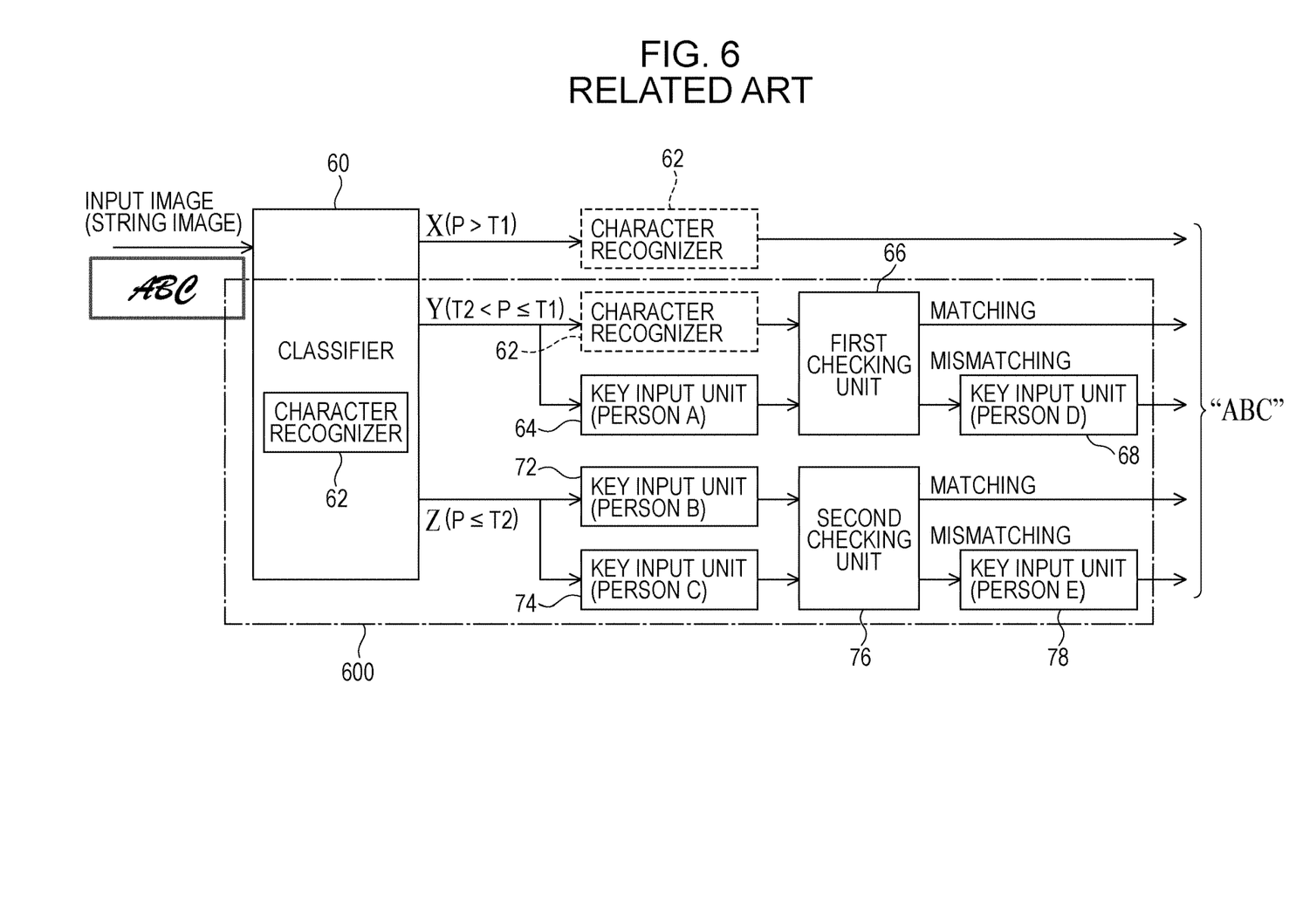
FIG. 6 is a diagram for describing a processing mechanism of an existing data entry system.

As a "premise", it is assumed that, in the existing system in FIG. 6, the thresholds T1 and T2 used to determine routing to paths X, Y, and Z are set so that the final degree of recognition accuracy involving that of outputs from persons and the character recognizer 62 is equal to or higher than a certain degree of accuracy. That is, these thresholds are determined in consideration of the rate of erroneous input of Person D or Person E performed when the checking result from the second checking unit 76 indicates a mismatch.

The case in which, in the system in FIG. 1, the checking result from the first checking unit 16 indicates that the recognition result from the character recognizer does not match Person A's recognition result will be discussed.

First, the case in which the process always proceeds to path Y2 when the checking result from the first checking unit 16 indicates a mismatch will be discussed. For the case of path Y2, Person C's input, as it is, will be the final output from the system. The rate of Person C's erroneous input is more than zero. Therefore, compared with the case in which the process always proceeds to path Z (that is, double manual entries), the final input accuracy becomes worse.

Next, the case in which the process always proceeds to path Z when the checking result from the first checking unit 16 indicates a mismatch will be discussed. In this case, also when the recognition accuracy of the character recognizer 12 is higher than that of a single manual entry (that is, when the process is to proceed to path Y), the process proceeds to path Z. Therefore, man-hours more than necessary are required to achieve the certain degree of accuracy.

In consideration of the two cases described above, an optimal solution is present in the case in which routing between path Y2 and path Z is performed at a medium ratio between the two cases (that is, the case in which all proceed to path Y2 and the case in which all proceed to path Z) described above so that the certain degree of accuracy is achieved. The optimal solution indicates the case in which, under the condition that the degree of final input accuracy is equal to or higher than the certain degree of accuracy, path Y2 is selected as much as possible.

According to the "premise" described above, when the recognition probability P has a value in the range in which routing to path Y is performed (that is, the case in which the recognition probability P>T2), the threshold T2 is set so that the degree of accuracy for path Y is equal to or higher than the certain degree of accuracy. Therefore, in the case where the checking result indicates that the recognition result from the character recognizer 12 does not match Person A's recognition result, path Y2 is selected when the recognition probability P>T2. Thus, the degree of final input accuracy may be equal to or higher than the certain degree of accuracy.

Thus, it is found that, to achieve the certain degree of accuracy in the entire system, the threshold T2 used for routing between path Y and path Z in the existing system (FIG. 6) may be used for routing between path Y2 and path Z.

As is clear from the state in which, for both the cases of path Y2 and path Z, the recognition result from the character recognizer 12 is not used, routing between path Y2 and path Z which is performed on the basis of the comparison between the recognition probability P from the character recognizer 12 and the threshold T2 is technically nonessential. If routing between path Y2 and path Z may be performed at the same ratio as that of routing based on the above-described comparison between the recognition probability P and the threshold T2, another method may be employed.

For example, if the ratio of routing between path Y2 and path Z in the above-described method of performing routing based on the comparison between the recognition probability P and the threshold T2 is statistically determined, routing between path Y2 and path Z may be performed so that the ratio is attained. To do this, for example, a certain quantity of input images whose recognition results are determined by the first checking unit 16 to indicate a mismatch may be temporarily accumulated, and the accumulated input images are routed between path Y2 and path Z in the ratio. Another method is that, every time a recognition result from the first checking unit 16 indicates a mismatch, routing may be performed by using a random number so that routing between path Y2 and path Z is performed in the ratio.

Alternatively, instead of routing performed in the same ratio as that for the case based on the comparison between the recognition probability P and the threshold T2, routing between path Y2 and path Z may be performed in a ratio predetermined by a user.

In addition, as a method of performing routing for attaining the target error rate of the entire system, the following method may be used.

That is, in this method, it is assumed that Person C's error rate of path Y2 is α, and the error rate of the entire path Z is β. In addition, it is assumed that the total count of input images which are input to the system in FIG. 1 (that is, which proceed to one of path Y and path Z) is N (or, it is assumed that routing is performed when N input images are accumulated). The number of input images may be, for example, the number of strings to be recognized, or the number of character frames to be recognized. In this method, it is assumed that the matching recognition results obtained in checking performed by the first checking unit 16 and the second checking unit 24 have no errors.

Assume that, among the total count N of input images, the number of recognition results for which checking results from the first checking unit 16 indicate a mismatch is M. Assume that the target value of the final error rate of the entire system is γ. In this case, the target value of the final error count of the entire system is γN at the maximum.

Assume that, among M recognition results for which checking results from the first checking unit 16 indicate a mismatch, the number of recognition results routed to path Y2 is Q. Since Person C's error rate is α, the error count for path Y2 is αQ. When a checking result from the first checking unit 16 indicates that the recognition results match each other, this is always counted as being correct. Therefore, the error count for the entire path Y including path Y1 and path Y2 is also αQ. Since the error rate of the entire path Z is β, the error count for the entire path Z is β(M−Q).

To make the error rate of the entire system equal to or less than the target value γ, the following relation is to hold.

$$\alpha Q+\beta(M-Q)\leq\gamma N \quad \text{Expression (1)}$$

Expression (1) is solved for Q, and the following expression is obtained.

$$Q\leq(\gamma N-\beta M)/(\alpha-\beta) \quad \text{Expression (2)}$$

Among M input images for which checking results from the first checking unit 16 indicate a mismatch, the number of input images routed to path Y2 is controlled so that Expression (2) is satisfied. Thus, the target recognition rate of the entire system is attained. The case in which Q equals to the right side in Expression (2) is an optimal solution which achieves the minimum man-hours in the entire system.

An exemplary apparatus configuration for implementing the method in FIG. 1 will be described by referring to FIG. 2. The example in FIG. 2 indicates an example in which routing between path Y2 and path Z is performed on the basis of the recognition probability P from the character recognizer 12.

In the apparatus configuration, an input image that is a recognition target is received by the character recognizer 12 and Person A's terminal. The character recognizer 12 performs character recognition on the input image. The character recognizer 12 transmits, to the first checking unit 16, the recognition result R and the recognition probability P obtained through character recognition. The character recognition method performed by the character recognizer 12 and the method of calculating the recognition probability are not particularly limiting. Any of methods of the related art, including the methods described in Japanese Unexamined Patent Application Publications No. 5-40853, No. 5-20500, No. 5-290169, No. 8-101880, No. 9-134410, and No. 9-259226, and methods which will be developed in the future may be used.

Figure 2:
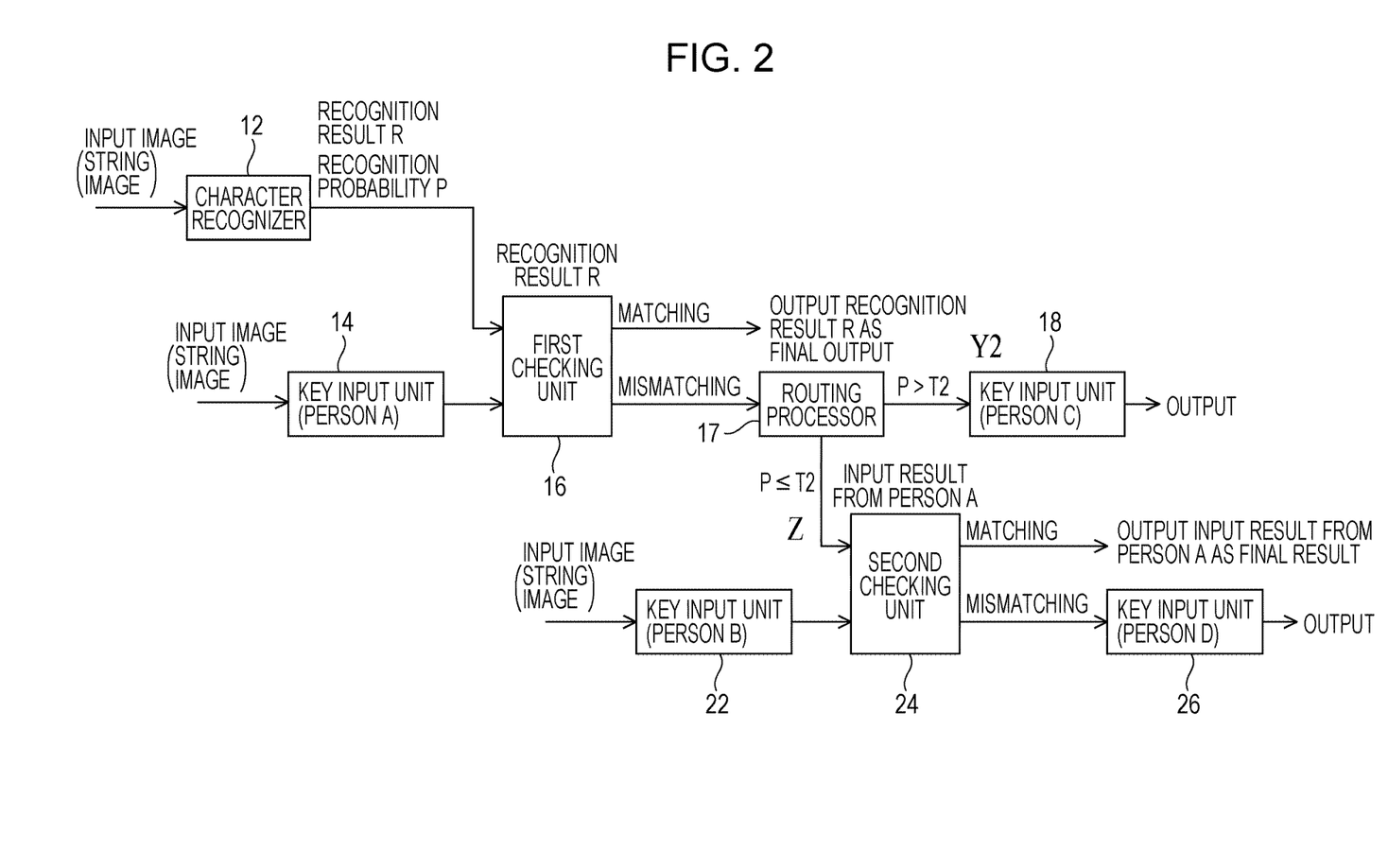
FIG. 2 is a diagram illustrating the apparatus configuration implementing a mechanism according to the exemplary embodiment.

Person A's terminal may be connected to the apparatus in FIG. 2, for example, over the Internet. In this case, the mechanism of displaying an input image and receiving input of a recognition result of the input image is provided by the key input unit 14 to the terminal, for example, in the form of a web service. Person A recognizes an input image displayed on the terminal, and inputs, from a keyboard of the terminal, a string indicated by the input image. The key input unit 14 receives, from the terminal, the string data that is input by Person A, and transmits the string data to the first checking unit 16.

The first checking unit 16 checks the recognition result R from the character recognizer 12 against the string that is input by Person A. When the checking result indicates that the recognition result R matches the string, the recognition result R (this is also Person A's recognition result) is output as the final recognition result of this apparatus. If the checking result indicates that the recognition result R does not match the string, the first checking unit 16 transmits, to a routing processor 17, identification information of the input image that is to be recognized this time, Person A's input data of the input image, and the recognition probability P, and requests the routing processor 17 to determine a route for the process.

If the recognition probability P is greater than the predetermined threshold T2, the routing processor 17 causes the process to proceed to path Y2. That is, the routing processor 17 performs the classification function of the string classifier 10.

In the example in FIG. 2, if the recognition probability P is greater than the threshold T2, the routing processor 17 selects path Y2, and transmits, to the key input unit 18, the identification information of the input image. The key input unit 18 provides, to the terminal of Person C who is registered in advance, the input image corresponding to the identification information, receives string data that is input by Person C in response to display of the input image, and outputs the data as the system's final recognition result of the input image.

If the recognition probability P is equal to or less than the threshold T2, the routing processor 17 selects path Z, transmits the identification information of the input image to the key input unit 22, and transmits Person A's input data to the second checking unit 24. The key input unit 22 provides, to the terminal of Person B which is registered in advance, the input image corresponding to the identification information, receives string data that is input by Person B in response to display of the input image, and transmits the data to the second checking unit 24. The second checking unit 24 checks Person A's input data against Person B's input data. If the result indicates that Person A's input data matches Person B's input data, the second checking unit 24 outputs the matching input data as the system's final recognition result of the input data. In contrast, if the checking result from the second checking unit 24 indicates that Person A's input data does not match Person B's input data, the key input unit 26 provides the input image, which corresponds to the identification information, to the terminal of Person D who is registered in advance and who is neither Person A nor Person B. The key input unit 26 receives string data that is input by Person D in response to display of the input image, and outputs the data as the system's final recognition result.

In the example in FIG. 2, the routing processor 17 determines the downstream path on the basis of a threshold process on the recognition probability P. Alternatively, routing may be performed between the paths in a certain ratio without using the recognition probability P as described above.

A modified example of the apparatus configuration in FIG. 2 will be described by referring to FIG. 3.

In the example in FIG. 2 described above, the condition satisfied by Person C registered in the key input unit 18 is that Person C is not Person A. The condition satisfied by Person B registered in the key input unit 22 is that Person B is not Person A (nor Person D). Therefore, even if Person B and Person C are the same person, these conditions are satisfied. The modified example in FIG. 3 is a simplified apparatus configuration example which may be employed when Person B and Person C are the same person.

In the example in FIG. 3, a part different from the example in FIG. 2 will be described. In this example, if the checking result from the first checking unit 16 indicates a mismatch, the first checking unit 16 transmits Person A's input data to the second checking unit 24, and transmits identification information of the input image to a key input unit 22A. The key input unit 22A provides, to the terminal of Person B who is registered in advance, the input image corresponding to the identification information, and receives string data that is input by Person B in response to display of the input image (This data is also Person C's input data in the example in FIG. 2). The key input unit 22A transmits the data to the second checking unit 24.

The second checking unit 24 checks Person A's input data, which is received from the first checking unit 16, against Person B's input data, which is received from the key input unit 22A. If the checking result indicates that Person A's input data matches Person B's input data, the matching input data is output as the system's final recognition result. In contrast, if the checking result indicates that Person A's input data does not match Person B's input data, the second checking unit 24 transmits, to a routing processor 17A, the identification information of the input image and Person B's input data (and the recognition probability P when necessary).

The routing processor 17A performs routing between path Y2 and path Z which are the downstream paths. The routing may be performed on the basis of the recognition probability P like the example in FIG. 2, or may be performed so that a certain ratio is satisfied as described above. For example, when routing is performed on the basis of the recognition probability P, if the recognition probability P is greater than the threshold T2, path Y2 is selected, and Person B's input data (corresponding to Person C's input data in the example in FIG. 2) is output as the final recognition result (path Y2). If the recognition probability P is equal to or less than the threshold T2, the key input unit 26 receives Person D's input data, and the input data is output as the final recognition result (path Z).

Figure 3:
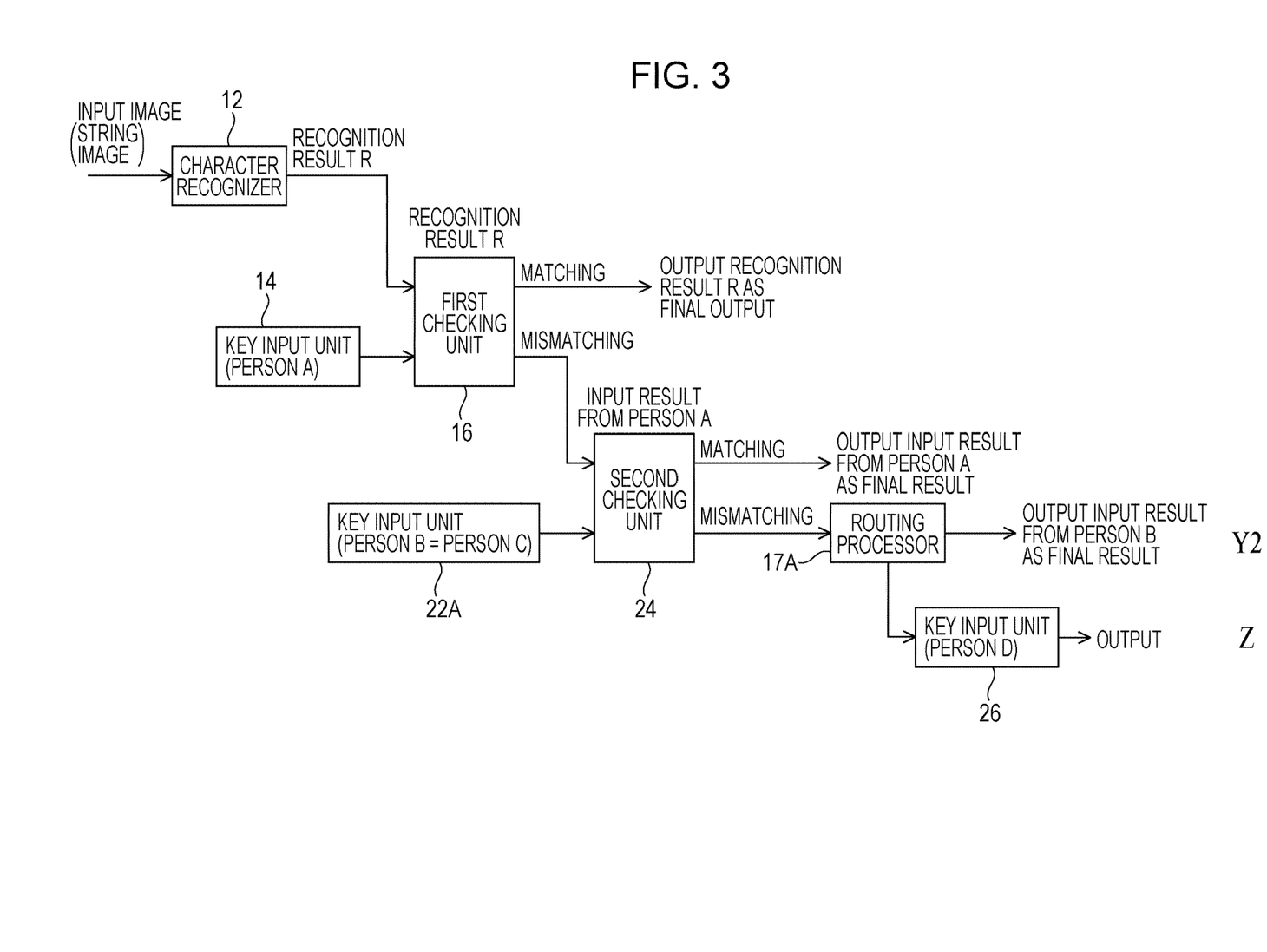
FIG. 3 is a diagram illustrating the apparatus configuration according to a first modified example.

In the example in FIG. 3, if the checking result from the first checking unit 16 indicates a mismatch, the second checking unit 24 always checks the pieces of input data against each other. Therefore, the checking operation is performed twice, which may result in higher-accurate determination as to whether the input data is correct, and may also result in reduction in the number of input images that proceed to path Z. If the number of input images that proceed to path Z is reduced, cost for Person D's input is reduced.

Figure 4:
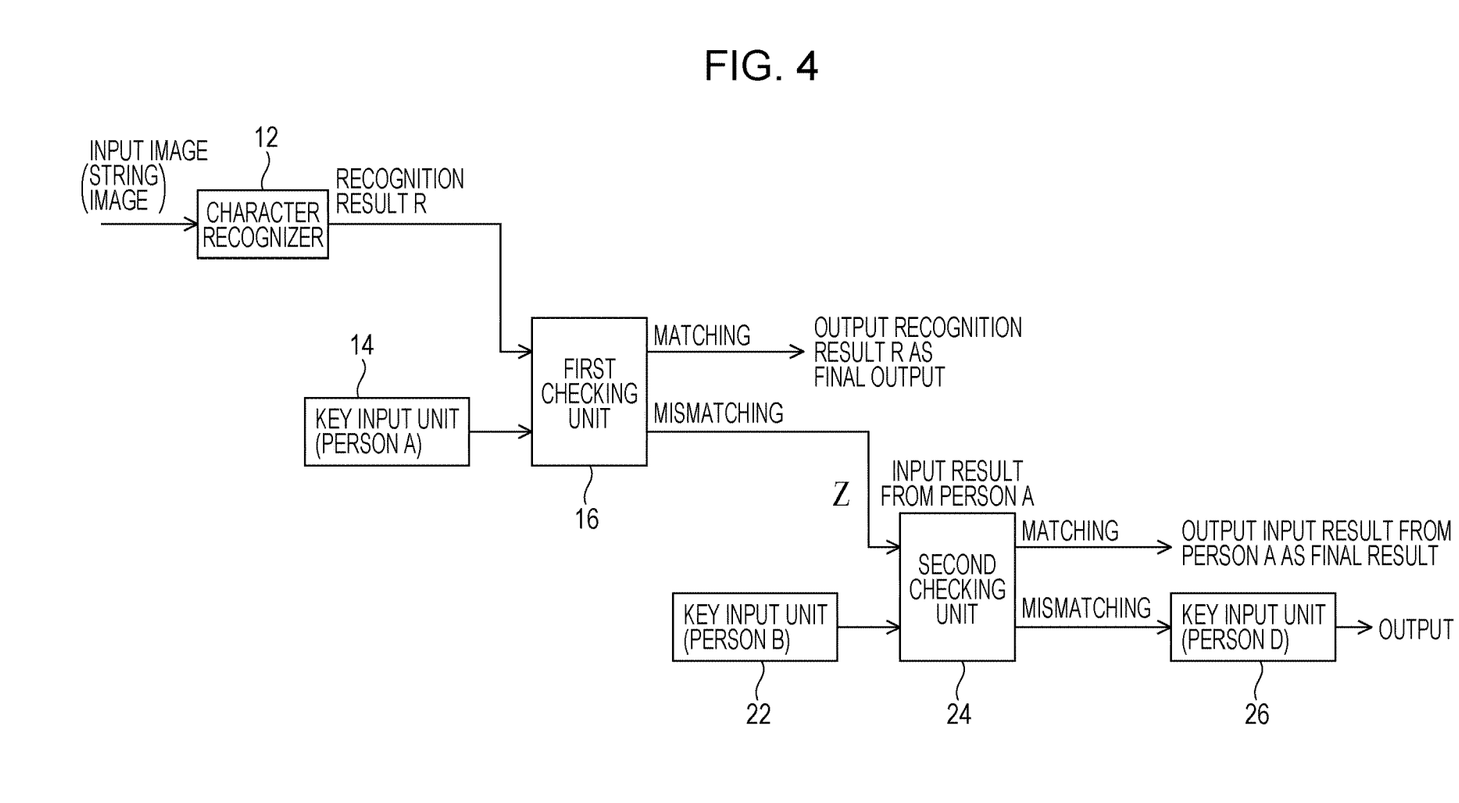
FIG. 4 is a diagram illustrating the apparatus configuration according to a second modified example.

A modified example will be further described by referring to FIG. 4. The example in FIG. 4 indicates the configuration in which path Y2 is removed from the example in FIG. 2, and in which, when the checking result from the first checking unit 16 indicates a mismatch, the process always proceeds to path Z.

In the example in FIG. 4, a part different from the example in FIG. 2 will be described. In this example, if the checking result from the first checking unit 16 indicates a mismatch, the first checking unit 16 transmits Person A's input data to the second checking unit 24, and transmits identification information of the input image to the key input unit 22. The key input unit 22 provides, to the terminal of Person B who is registered in advance, the input image corresponding to the identification information, and receives string data that is input by Person B in response to display of the input image. The key input unit 22 transmits the data to the second checking unit 24.

The second checking unit 24 checks Person A's input data, which is received from the first checking unit 16, against Person B's input data, which is received from the key input unit 22. If the checking result indicates that the pieces of input data match each other, the matching input data is output as the system's final recognition result. In contrast, if the checking result indicates that the pieces of input data do not match each other, the second checking unit 24 transmits identification information of the input image to the key input unit 26. The key input unit 26 provides the input image corresponding to the identification information to the terminal of Person D who is registered in advance and who is neither Person A nor Person B, receives string data that is input by Person D in response to display of the input image, and outputs the data as the system's final recognition result.

The input from Person C and Person D in the example in FIG. 2 described above is output, as it is, as the system's final recognition result, without being checked against another recognition result. Therefore, an influence of input from Person C and Person D on the recognition rate (accuracy rate) of the entire system is greater than that of Person A and Person B (these inputs are checked against another recognition result). To attain the target value of the recognition rate of the entire system, Person C and Person D are required to take more time for input with extra care than Person A and Person B. Alternatively, Person C and Person D are required to have higher level of skill than Person A and Person B. Thus, the input cost for Person C and Person D is higher than that for Person A and Person B.

In the example in FIG. 4, in the case where the checking result from the first checking unit 16 indicates a mismatch, the path (path Y2) involving Person C's input is omitted. Instead, Person B's input is always performed. Even in this case, since Person B's input cost is lower than Person C's case, the manual input cost of the entire system is lower than that of the example in FIG. 2.

Figure 5:
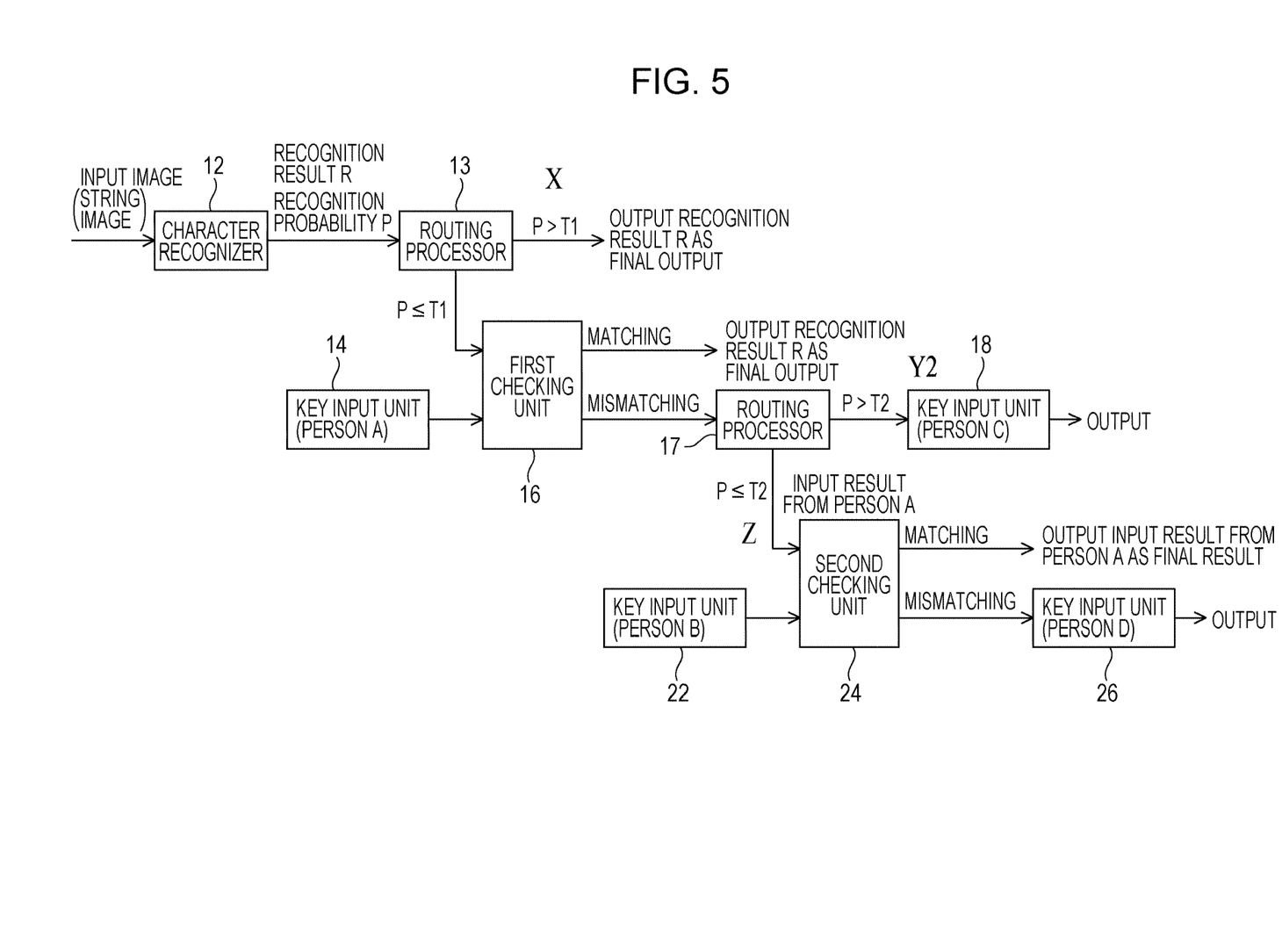
FIG. 5 is a diagram illustrating the apparatus configuration according to a third modified example.

A modified example will be further described by referring to FIG. 5. The example in FIG. 5 indicates the configuration in which the configuration corresponding to path X in the existing system in FIG. 6, that is, a routing processor 13, is added to the example in FIG. 2.

In the example in FIG. 5, the routing processor 13 receives the recognition result R and the recognition probability P which are output from the character recognizer 12. If the received recognition probability P is greater than the threshold T1 (T1>T2), the routing processor 13 outputs the recognition result R from the character recognizer 12 as the system's final recognition result. If the recognition probability P is equal to or less than the threshold T1, the routing processor 13 inputs the recognition result R to the first checking unit 16. The process flow after the first checking unit 16 and the apparatus configuration for the process flow are the same as those in FIG. 2.

Thus, the configurations in FIGS. 1 and 2 may be also applied to the apparatus configuration in which the recognition result from the character recognizer 12 is used, as it is, as the final output in the range in which the recognition probability P is very high.

The exemplary embodiment and its modified examples of the present disclosure are described above. However, the exemplary embodiment and the modified examples are merely exemplary. Various changes may be made without departing from the scope of the present disclosure.

For example, in the exemplary embodiment and the modified examples described above, a string in an input image is recognized. However, the method used in the exemplary embodiment and the modified examples may be applied not only to character recognition but also to an information processing apparatus or a system in general which determines input data and outputs the determination result. That is, the method used in the exemplary embodiment and the modified examples may be applied in general to an apparatus or a system in which a mechanical determination unit (one example is the character recognizer 12) and a person make a determination on input data, and in which the results from the determination unit and the person are collectively used to determine the determination result of the apparatus or the entire system.

The apparatus or the system according to the exemplary embodiment and the modified examples described above may be formed as a hardware logic circuit as one example. As another example, the apparatus or the system according to the exemplary embodiment and the modified examples may be implemented, for example, by a built-in computer executing programs describing the functions of the function modules in the system or the apparatus. A computer has a circuit configuration in which hardware components, for example, a processor such as a central processing unit (CPU), a memory (primary memory), such as a random-access memory (RAM) and a read-only memory (ROM), a hard disk drive (HDD) controller controlling an HDD, various input/output (I/O) interfaces, and a network interface controlling for connection with a network such as a local-area network, are connected to each other, for example, through a bus. In addition, the bus may be connected, for example, through the I/O interfaces to a disk drive for reading and/or writing on a portable disk recording medium, such as a compact disc (CD) or a digital versatile disc (DVD), a memory reader/writer for reading and/or writing on portable nonvolatile recording media having various standards, such as a flash memory, and the like. The programs describing the processes of the function modules described above are stored in a fixed storage such as a hard disk drive via a recording medium, such as a CD or a DVD, or via a communication unit such as a network. Then, the programs are installed in a computer. The programs stored in the fixed storage are read onto the RAM, and are executed by the processor such as a CPU. Thus, the function modules described above are implemented. In addition, the apparatus or the system according to the exemplary embodiment and the modified examples may be formed in combination with software and hardware.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a determination unit that performs determination on input information and outputs a determination result;
   a first receiving unit that receives a first person's input of a first determination result on the input information;
   a second receiving unit that receives a second person's input of a second determination result on the input information;
   a third receiving unit that receives a third person's input of a third determination result on the input information and that outputs the third determination result as a final output;
   a first checking unit that checks the determination result against the first determination result, the determination result being output by the determination unit, the first determination result being received by the first receiving unit, and that, when the determination result matches the first determination result, outputs the matching determination result as the final output;
   a second checking unit that checks the first determination result against the second determination result, the first determination result being received by the first receiving unit, the second determination result being received by the second receiving unit, and that, when the first determination result matches the second determination result, outputs the matching determination result as the final output; and
   a controller that, when the input information is received, operates the determination unit, the first receiving unit, and the first checking unit, and that, when it is determined, in the checking performed by the first checking unit, that the determination result from the determination unit does not match the first determination result received by the first receiving unit, further operates selectively one of a unit set and the third receiving unit, the unit set being constituted by the second receiving unit and the second checking unit.

2. The information processing apparatus according to claim 1, further comprising:
   a unit for calculating a degree of determination accuracy of the determination unit, the degree of determination accuracy being obtained for the input information,
   wherein, when it is determined, in the checking performed by the first checking unit, that the determination result from the determination unit does not match the first determination result received by the first receiving unit, if the degree of determination accuracy is greater than a first threshold, the controller operates the third receiving unit, and, if the degree of determination accuracy is equal to or less than the first threshold, the controller operates the second receiving unit and the second checking unit.

3. The information processing apparatus according to claim 2,
   wherein, if the degree of determination accuracy is greater than a second threshold, the second threshold being greater than the first threshold, the controller exerts control so as to use the determination result from the determination unit as the final output,
   wherein, if the degree of determination accuracy is equal to or less than the second threshold, the controller exerts control so as to operate the determination unit, the first receiving unit, and the first checking unit, and
   wherein, when it is determined, in the checking performed by the first checking unit, that the determination result from the determination unit does not match the first determination result received by the first receiving unit, if the degree of determination accuracy is equal to or less than the second threshold and is greater than the first threshold, the controller exerts control so as to operate the third receiving unit, and, if the degree of determination accuracy is equal to or less than the first threshold, the controller exerts control so as to operate the second receiving unit and the second checking unit.

4. A non-transitory computer readable medium storing a program causing a computer to execute a process comprising:
   performing a determination operation in which determination is performed on input information and in which a determination result is output;
   performing a first reception operation in which a first person's input of a first determination result on the input information is received;

performing a second reception operation in which a second person's input of a second determination result on the input information is received;

performing a third reception operation in which a third person's input of a third determination result on the input information is received and in which the third determination result is output as a final output;

performing a first checking operation in which the determination result is checked against the first determination result, and in which, when the determination result matches the first determination result, the matching determination result is output as the final output;

performing a second checking operation in which the first determination result is checked against the second determination result, and in which, when the first determination result matches the second determination result, the matching determination result is output as the final output; and when the input information is received, performing the determination operation, the first reception operation, and the first checking operation, and, when it is determined, in the first checking operation, that the determination result does not match the first determination result, further performing selectively one of an operation set and the third reception operation, the operation set being constituted by the second reception operation and the second checking operation.

5. An information processing apparatus comprising:

a determination unit that performs determination on input information and outputs a determination result;

a first receiving unit that receives a first person's input of a first determination result on the input information;

a second receiving unit that receives a second person's input of a second determination result on the input information;

a first checking unit that checks the determination result against the first determination result, the determination result being output by the determination unit, the first determination result being received by the first receiving unit, and that, when the determination result matches the first determination result, outputs the matching determination result as the final output;

a second checking unit that checks the first determination result against the second determination result, the first determination result being received by the first receiving unit, the second determination result being received by the second receiving unit, and that, when the first determination result matches the second determination result, outputs the matching determination result as the final output; and a controller that, when the input information is received, operates the determination unit, the first receiving unit, and the first checking unit, and that, when it is determined, in the checking performed by the first checking unit, that the determination result from the determination unit does not match the first determination result received by the first receiving unit, further operates the second receiving unit and the second checking unit.

6. The information processing apparatus according to claim 5, further comprising:

a third receiving unit that receives a third person's input of a third determination result on the input information and that outputs the third determination result as a final output, wherein, when it is determined, in the checking performed by the second checking unit, that the first determination result received by the first receiving unit does not match the second determination result received by the second receiving unit, the controller selectively performs a first process and a second process, the first process being a process of outputting the second determination result as the final output, the second process being a process of operating the third receiving unit.

7. The information processing apparatus according to claim 5, further comprising:

a third receiving unit that receives a third person's input of a third determination result on the input information and that outputs the third determination result as a final output, wherein, when it is determined, in the checking performed by the second checking unit, that the first determination result received by the first receiving unit does not match the second determination result received by the second receiving unit, the controller operates the third receiving unit.

8. A non-transitory computer readable medium storing a program causing a computer to execute a process comprising:

performing a determination operation in which determination is performed on input information and in which a determination result is output;

performing a first reception operation in which a first person's input of a first determination result on the input information is received;

performing a second reception operation in which a second person's input of a second determination result on the input information is received;

performing a first checking operation in which the determination result is checked against the first determination result, and in which, when the determination result matches the first determination result, the matching determination result is output as the final output;

performing a second checking operation in which the first determination result is checked against the second determination result, and in which, when the first determination result matches the second determination result, the matching determination result is output as the final output; and when the input information is received, performing the determination operation, the first reception operation, and the first checking operation, and, when it is determined, in the first checking operation, that the determination result does not match the first determination result, further performing the second reception operation and the second checking operation.

* * * * *